Nov. 29, 1960 F. H. LEGGE 2,962,126
FOOT OPERATED WHEEL BRAKE
Filed Sept. 16, 1957 2 Sheets-Sheet 2
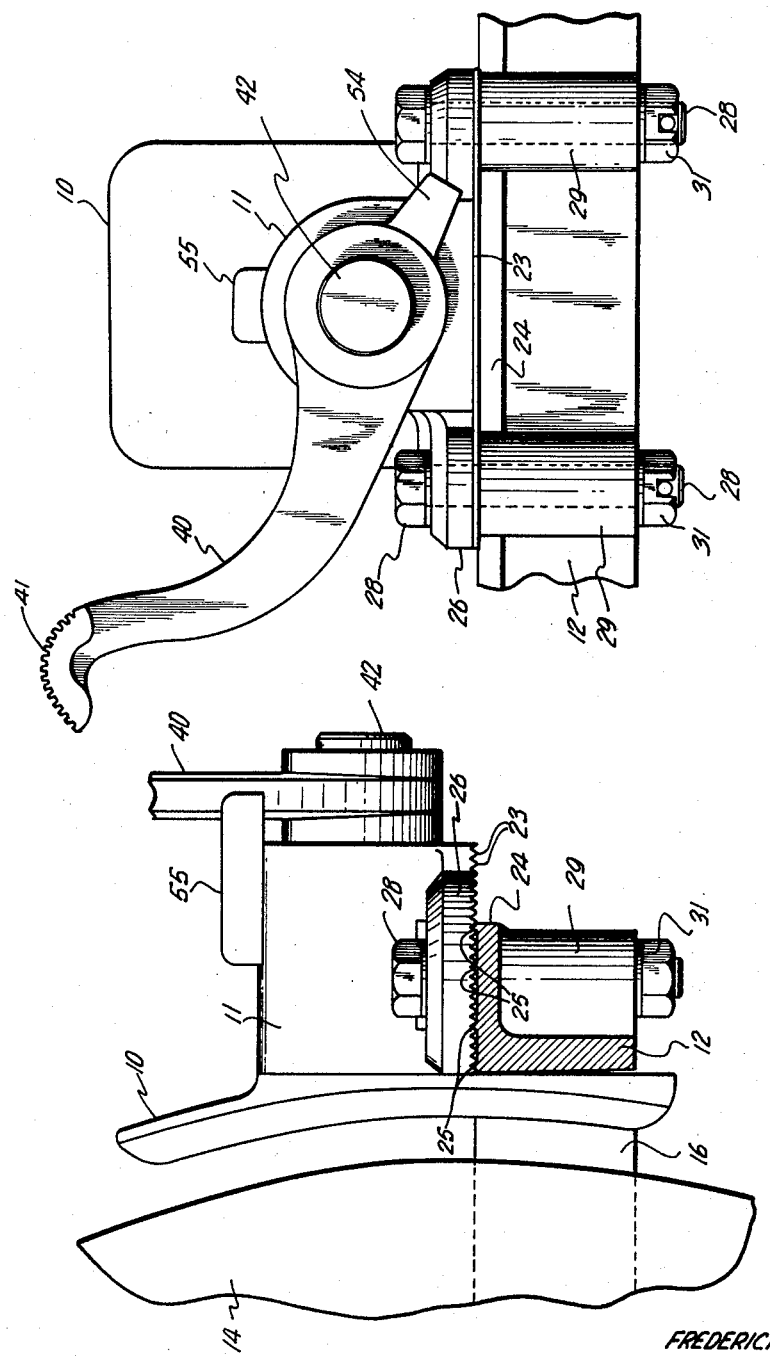
INVENTOR.
FREDERICK H. LEGGE
BY
ATTORNEY 2,962,126
Patented Nov. 29, 1960

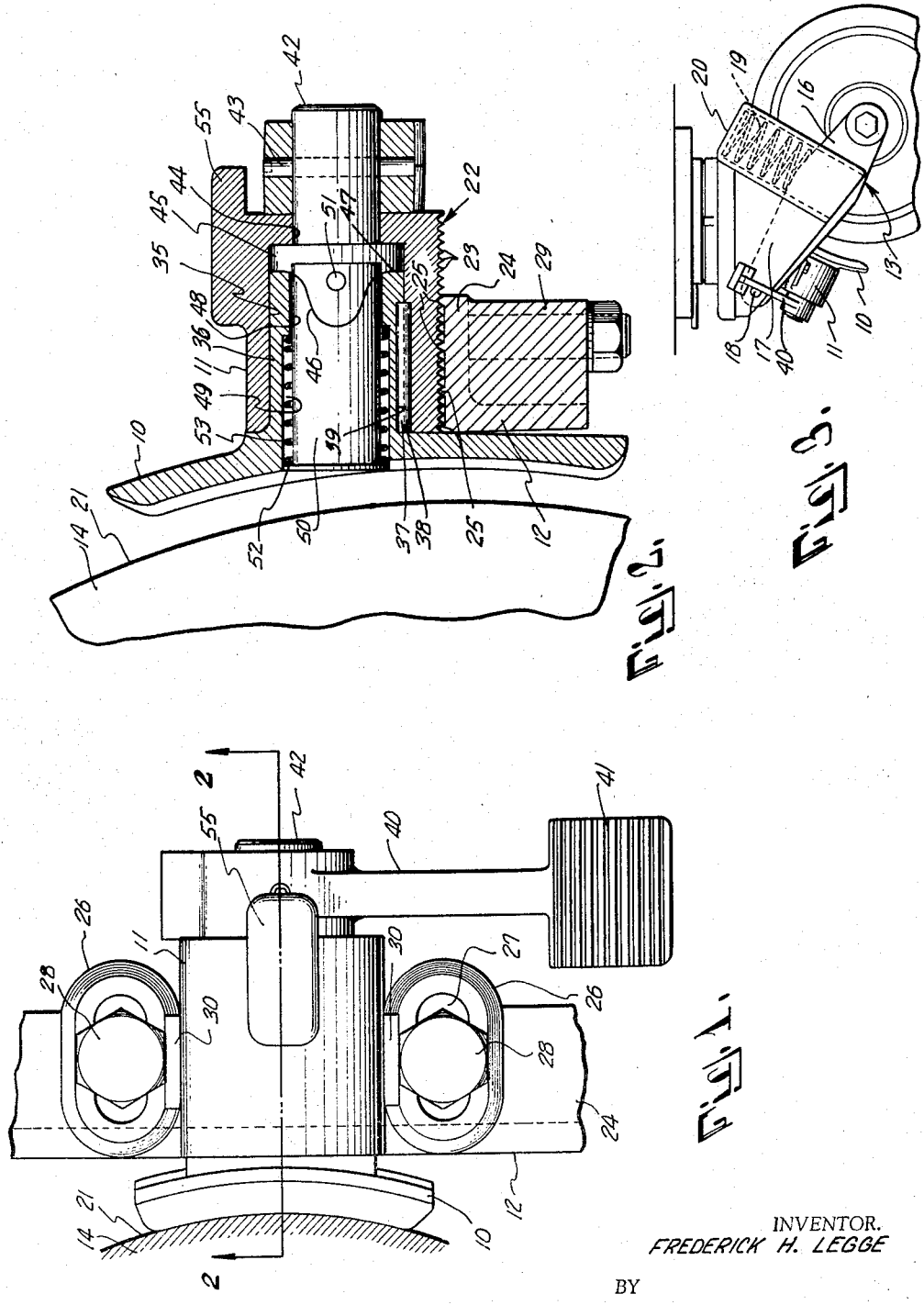

2,962,126
FOOT OPERATED WHEEL BRAKE

Frederick H. Legge, La Crescenta, Calif., assignor to Aerol Co., Inc., Los Angeles, Calif., a corporation of California Filed Sept. 16, 1957, Ser. No. 684,175

6 Claims. (Cl. 188—74)

The invention relates to caster wheels and has special reference to a brake for a caster wheel usually employed for anchoring the wheel to the floor when the vehicle carried by the caster wheel is parked. The invention is more particularly concerned with a brake suited to mounting upon the fork of the wheel and is designed to be of such nature that it can readily move about as the fork might be required to move so as to be always in a braking position.

As a result of considerable acceleration in the employment of trucks and dollies for sundry warehouse and more particularly, factory purposes, corresponding attention has been devoted to caster wheels and brakes by means of which the caster wheel supported truck can be securely anchored in a desired position when it is to be parked. Separate and apart from the use of floor brakes which serve as a direct connection between the vehicle and the floor surface irrespective of the wheels there has been a degree of development with respect to parking brakes operable directly upon some part or other of the wheel. Parking brakes for the wheels, however, have had many objectionable factors which have interfered to a considerable degree with the extent of use of such type of brakes.

A further element of difficulty in applying brakes of somewhat conventional mechanical principles to caster wheels is the fact that many caster wheels are designed to swivel and if the brake is to be operated at all times, some scheme or mechanism must be attempted to make sure that the brake swivels to each and every position of the wheel. Some attempts have been made to secure brakes to the wheel axle about which they are designed to pivot in order to move them into and out of braking position. Although these attempts have resulted in brakes capable of moving about with the wheel, they have been crudely constructed and poorly designed to a large degree and have not met with consumer acceptance.

It is therefore among the objects of the invention to provide a new and improved foot operated wheel brake which is especially suited to use on swivelly mounted caster wheels.

Another object of the invention is to provide a new and improved wheel brake for swiveling caster wheels of such nature that it is capable of moving in virtually any desired direction with the direct support for the wheel so as to always be not only in a proper braking position but also in a position wherein it can be operated with relative ease.

Still another object of the invention is to provide a new and improved wheel brake of rugged construction and of simple design which is sufficiently compact to be capable of movement to all positions to which a swivel caster wheel is adapted to be moved but which, in spite of a construction adapted to such purpose, is acceptable for strenuous requirements and positive performance throughout a relatively long period of use.

Still another object of the invention is to provide a new and improved wheel brake for swivelly mounted caster wheels which is capable of being properly adjusted at any time in order to preserve an effective braking capacity though wheels of different diameter might be encountered and also where after a period of use a wheel tread might wear down to a point which would discourage an effective braking action.

Also included among the objects of the invention is to provide a positive acting foot operated wheel brake for swivelling caster wheels which is relatively inexpensive to manufacture though of extremely rugged character and which contains parts of such simple design that they substantially minimize servicing and replacement and are also such as to make installation under virtually all circumstances a relativaly simple operation.

With these and other objects in view, the invention consists in the construction, arrangement and combination of the various parts of the device whereby the objects contemplated are attained as hereinafter set forth, pointed out in the appended claims and illustrated in the accompanying drawings.

In the drawings:

Figure 1 is a plan view of the brake mounted in position adjacent a wheel.

Figure 2 is a longitudinal sectional view taken on the line 2—2 of Figure 1.

Figure 3 is a side elevational view of a characteristic swivelly mounted shock absorbing caster wheel to which the brake can be applied.

Figure 4 is a side elevational view of the brake.

Figure 5 is an end elevational view of the brake.

In an embodiment of the invention chosen for the purpose of illustration there is shown a brake device comprising a brake shoe 10 secured in a brake housing 11 which in turn is mounted upon a base portion 12 of a fork 13. A wheel 14 to which the brake is to be applied is rotatably mounted between arms 16 of the fork, the arms in turn being pivotally secured to a caster body 17 at points 18. In the type of caster wheel mounting made reference to, the arms 16 of the fork are adapted to pivot about the point 18 to a limited extent cushioned by action of a shock absorbing spring 19 contained within a spring casing 20, the spring casing being a portion of the body 17. It will be noted from the foregoing that the brake device herein disclosed is one which can be employed in connection with a caster wheel which is adapted to move to a degree both in a vertical direction as well as in a direction swivelled about a swivel axis of the caster body.

By way of example the fork indicated generally by the reference character 13 has its arms maintained in spaced relationship to each other, thereby to accommodate the wheel between the arms and the base portion 12 serves to hold the arms separated and provide a mounting close to a tread surface 21 of the wheel.

In the example chosen the brake housing 11 has a flat area 22 provided throughout its length with a series of closely spaced teeth or corrugations 23. An upper flange or leg 24 of the base portion 12 may be provided with similar teeth 25 adapted to receive the teeth 23. For anchoring the brake housing 11 to the base portion brackets 26 are employed extending laterally at the brake housing in which are bolt receiving slots 27 adapted to the reception of bolts 28. Blocks 29 for ruggedness and convenience may be provided welded or otherwise attached to the base 12 having holes therethrough for reception of the bolts 28. By properly adjusting the teeth of the brake housing with respect to the teeth on the base portion, the housing may be set in any one of the positions permitted and there bolted securely and permanently in place. Bosses 30 may be employed which serve to engage flats on the heads of the bolts are in position they will not be permitted to turn as nuts 31 are applied to the bolts at the underside.

Within the brake housing there is provided a chamber 35 which is axially disposed and directed generally in a perpendicular direction with respect to the tread surface of the wheel. On the brake shoe 10 is a sleeve 36 which mounts the brake shoe upon the brake housing, the sleeve being adapted to slide freely in an axial direction. A key 37 which, if desired, may be in the form of a pin, is mounted respectively in keyways 38 and 39 of the brake housing and sleeve respectively in order to inhibit rotation of the brake shoe with respect to the brake housing.

To manipulate the brake there is provided a pedal arm 40 having a tread portion 41 at the outermost end. The pedal arm is non-rotatably secured to a shaft 42 by means of a pin 43. The shaft in turn is rotatably mounted within an aperture 44 in the brake housing, the aperture being in axial alignment with the chamber 35.

On the shaft 42 is a head 45 which is adapted to rotate within the chamber 35. The head is provided with a camway or cam surface 46 and this camway or surface has a complementary camway or surface 47 formed at the outer end of the sleeve 36 adapted to cooperate with the camway 46.

Within the sleeve 36 is an axial passage 48, at one end of which is an enlargement 49. Pinned to the shaft 42 by means of a pin 51 is a spring keeper shaft 50 at an outer end of which is a spring keeper 52. A coiled spring 53 is maintained in the enlargement 49 between the keeper 52 and the bottom of the enlargement 49. The spring is biased normally to urge the sleeve 36 toward the right and hence to normally retain the brake shoe 10 in released position.

When it becomes desirable to set the brake, the tread portion 41 of the pedal arm is depressed which causes the shaft 42 to be rotated in a counter-clockwise direction, as viewed in Figure 5. The arm can be depressed until a stop 54 strikes a stop block 55. As the shaft 42 rotates, the camway 46 also rotates and is forced against the camway 47. This action shifts the sleeve 36 in a direction from right to left as viewed in Figure 2 and causes the brake shoe 10 to be forced against the tread portion 21 of the wheel 14. Movement is against the compressive force in the spring 53. During initial stages of the operation the brake shoe and its sleeve is prevented from rotating out of position by action of the key 37. Once the brake shoe has engaged the wheel, however, the resistance there encountered will be sufficient to hold the brake shoe in its proper position.

When the brake shoe is to be released, the tread portion 41 of the arm 40 is released and tension built up in the spring 53 will act against the sleeve 36 and force the sleeve and the brake shoe 10 away from engagement with the wheel. Should an adjustment be needed at any time with respect to the setting of the brake shoe, it is necessary only to release the nuts 31 an amount sufficient to permit the teeth 23 and 25 to disengage and the brake housing can then be shifted to a different position relative to the wheel and subsequently anchored in the newly selected position. It will be noted further that inasmuch as the brake device is readily adapted to be mounted at the base of a fork between which the wheel is contained, the brake device will always be in a proper braking position regardless of whether the wheel swivels about the swivel axis of the caster or pivots about the pivot point 18. Moreover, the positioning of the brake device and its tread portion is such that it is readily able to be reached by the foot of an operator regardless of the position into which it has been moved.

There has accordingly been disclosed herein an effective and rugged brake mechanism readily adaptable to virtually any type of movable swivelly mounted wheel which is always in the most effective position for operation regardless of movement of the wheel.

While I have herein shown and described my invention in what I have conceived to be the most practical and preferred embodiment, it is recognized that departures may be made therefrom within the scope of my invention, which is not to be limited to the details disclosed herein but is to be accorded the full scope of the claims so as to embrace any and all equivalent devices.

Having described my invention, what I claim as new and desire to secure by Letters Patent is:

1. A pedal actuated parking brake for a caster wheel comprising a caster body, a fork pivotally mounted on a horizontal axis on the body having spaced arms for reception of a wheel therebetween, a base for said fork interconnecting the arms and overlying the wheel, a brake housing fixed on said base and having a chamber with the axial center normal to the wheel, a brake shoe adjacent the wheel at the tread portion, a sleeve on the shoe having an axially slidable and non-rotatable mounting in the chamber, a brake arm, a shaft on said arm in axial alignment with said brake housing and forming a rotatable mounting for the arm on said brake housing, and camways respectively on the shaft and the sleeve having an overridden operable engagement whereby to shift the brake shoe to a locked position against the wheel in response to rotation of said arm.

2. A parking brake for a caster wheel comprising a caster body, a fork mounted on the body, said fork comprising spaced legs and a base connecting said legs, a brake housing fixed on said base and having a chamber with the axial center normal to the wheel, a brake shoe adjacent the wheel, a sleeve on the shoe having an axially slidable mounting in the chamber, rotation inhibiting means between the brake shoe and the base, a brake shaft forming a rotatable mounting on said brake housing, a pedal on the shaft, camways within said brake housing located respectively on the shaft and the sleeve and having an operable engagement whereby to shift the brake shoe against the wheel in response to rotation of said pedal, the pedal being adapted to rotate said shaft to and between a brake-released position and a braking position, one camway comprising diametrically opposed rounded projections extending in an axial direction with respect to said chamber, the other camway having diametrically opposed rounded recesses formed therein for receiving said projections respectively when the parking brake device is in brake-released position, said other camway having diametrically opposed land surfaces extending circumferentially of said other camway between said recesses and in a plane perpendicular to the axis of said chamber, and against which said projections engage when the pedal has been moved to its braking position thereby to retain the brake shoe in engagement with said wheel for parking purposes.

3. A pedal actuated parking brake for a caster wheel comprising a caster body, a fork pivotally mounted on a horizontal axis on the body having spaced arms for reception of a wheel therebetween and a spring cushion between said fork and said body, a base for said fork interconnecting the arms and overlying the wheel, a brake housing fixed on said base and having a chamber with the axial center normal to the wheel, a brake shoe adjacent the wheel at the tread portion, a sleeve on the shoe having an axially slidable and non-rotatable mounting in the chamber, a brake arm, a shaft on said arm in axial alignment with said brake housing and forming a rotatable mounting for the arm on said brake housing, and camways respectively on the shaft and the sleeve having an overridden operable engagement whereby to shift the brake shoe to a locked position against the wheel in response to rotation of said arm.

4. A pedal-actuated parking brake device for a caster wheel comprising a wheel support and a wheel rotatably mounted on said support, a brake housing on said support having a cylindrical chamber therein perpendicular to a portion of the wheel, a brake shoe adjacent said wheel portion and a sleeve on said shoe reciprocatably mounted in said chamber, means holding the sleeve and the housing in non-rotatable and axially slidable engagement, a cam shaft rotatably mounted in the housing in axial alignment with the chamber, a camway on the shaft within said chamber and a matching camway on the sleeve, a brake arm non-rotatably mounted on said cam shaft adapted to rotate said cam shaft for moving said brake shoe to and between a brake-released position and a braking position, one camway comprising diametrically opposed rounded projections extending in an axial direction with respect to said chamber, the other camway having diametrically opposed rounded recesses formed therein for receiving said projections respectively when the parking brake device is in brake-released position, said other camway having diametrically opposed land surfaces extending circumferentially of said other camway between said recesses and in a plane perpendicular to the axis of said chamber and against which said projections engage when the brake arm has been moved to its braking position thereby to retain the brake shoe in engagement with said wheel for parking purposes.

5. A pedal-actuated parking brake device for a caster wheel comprising a wheel support and a wheel rotatably mounted on said support, a brake housing on said support having a cylindrical chamber therein perpendicular to the perimeter of the wheel, a brake shoe and a sleeve on said shoe reciprocatably mounted in said chamber in a position whereby the shoe lies adjacent the tread of the wheel, means holding the sleeve and the housing in non-rotatable and axially slidable engagement, a cam shaft rotatably mounted in the housing in axial alignment with the chamber, a camway on the shaft within said chamber and a matching camway on the sleeve, a brake arm non-rotatably attached to said cam shaft adapted to rotate said cam shaft for moving said brake shoe to and between a brake-released position and a braking position, spring means acting between the shoe and the brake arm biased to move said shoe out of braking position, interengageable stops on the housing and the brake arm for limiting rotation of the brake arm and said cam shaft beyond said brake-released position, one camway comprising diametrically opposed rounded projections extending in an axial direction with respect to said chamber, the other camway having diametrically opposed rounded recesses formed therein for receiving said projections respectively when the parking brake device is in brake-released position, said other camway having diametrically opposed land surfaces extending circumferentially of said other camway between said recesses and in a plane perpendicular to the axis of said chamber and against which said projections engage when the brake arm has been rotated to its braking position thereby to retain the brake shoe in engagement with said wheel for parking purposes.

6. A pedal-actuated parking brake device for a caster wheel comprising a wheel support and a wheel rotatably mounted on said support, a brake housing, an adjustable connection between the housing and said support whereby to position the housing at a selected position relative to the wheel, said housing having a cylindrical chamber therein perpendicular to a tread of the wheel, a brake shoe and a sleeve on said shoe reciprocatably mounted in said chamber in a position whereby the shoe lies adjacent the tread of the wheel, a key holding the sleeve and the housing in non-rotatable and axially slidable engagement, a cam shaft rotatably mounted in the housing in axial alignment with the chamber, a camway on the shaft within said chamber and a matching camway on the sleeve, a spring keeper shaft in said chamber secured to said cam shaft and a spring between the keeper shaft and the sleeve biased in a direction moving said sleeve and brake shoe out of braking position, and a brake arm non-rotatably attached to said cam shaft adapted to rotate said cam shaft whereby to move said brake shoe into braking position against the resistance of said spring.

References Cited in the file of this patent

UNITED STATES PATENTS

| | | |
|---|---|---|
| 1,428,932 | Bayer | Sept. 12, 1922 |
| 1,588,832 | Young | June 15, 1926 |
| 1,849,584 | Milan | Mar. 15, 1932 |
| 2,214,176 | Portle | Sept. 10, 1940 |
| 2,634,986 | McDaniel | Apr. 14, 1953 |
| 2,775,313 | Kurvers et al. | Dec. 25, 1956 |
| 2,820,644 | Smith | Jan. 21, 1958 |

FOREIGN PATENTS

| | | |
|---|---|---|
| 509,653 | Canada | Feb. 1, 1955 |